United States Patent [19]

Geihs et al.

[11] Patent Number: 5,778,176
[45] Date of Patent: Jul. 7, 1998

[54] SYSTEM FOR AUTOMATICALLY TRANSFERRING ACCESS AUTHORIZATION OF THIRD NODE TO FIRST NODE EVEN THROUGH FIRST NODE IS NOT PREVIOUSLY AUTHORIZED TO ACCESS FUNCTION OF SECOND NODE IN COMPUTER NETWORK

[75] Inventors: Kurt Geihs, Bensheim; Ulf Hollberg, Wiesloch; Herbert Eberle; Reinhard Heite, both of Heidelberg, all of Germany

[73] Assignee: International Business Machines Corporation, Armonk, N.Y.

[21] Appl. No.: 727,208

[22] Filed: Oct. 8, 1996

Related U.S. Application Data

[63] Continuation of Ser. No. 385,400, Feb. 7, 1995, abandoned, which is a continuation of Ser. No. 900,029, Jun. 17, 1992, abandoned.

[30] Foreign Application Priority Data

Jun. 21, 1991 [EP] European Pat. Off. ............... 91110207

[51] Int. Cl.$^6$ ................ G06F 9/44; G06F 13/38
[52] U.S. Cl. ................ 395/200.12; 395/200.6; 395/200.19
[58] Field of Search .............. 395/200.2, 200.6, 395/200.9, 200.11, 200.12

[56] References Cited

U.S. PATENT DOCUMENTS

| | | | |
|---|---|---|---|
| 4,780,821 | 10/1988 | Crossley | 395/650 |
| 4,924,328 | 5/1990 | Hershey et al. | 395/200 |
| 4,937,863 | 6/1990 | Robert et al. | 380/4 |
| 5,003,595 | 3/1991 | Collins et al. | 395/700 |
| 5,005,122 | 4/1991 | Griffin et al. | 395/200 |
| 5,023,907 | 6/1991 | Johnson et al. | 380/4 |
| 5,138,712 | 8/1992 | Corbin | 395/700 |
| 5,204,897 | 4/1993 | Wyman | 380/4 |
| 5,260,999 | 11/1993 | Wyman | 380/4 |

*Primary Examiner*—Krisna Lim
*Attorney, Agent, or Firm*—Whitham, Curtis, Whitham & McGinn; Arthur J. Samodovitz

[57] ABSTRACT

A computer network, having at least three nodes for implementing predetermined functions, comprises an OBJECT PASSING AGENT (OPA) storing the access authorizations of the individual nodes relative to each other. By means of calls (passing, returned), the stored access authorizations may be modified. With the aid of a further call (inquire), access authorizations may be verified. The desired access authorizations are defined by the user in the interface descriptions of the individual nodes. These descriptions are used by a compiler to generate the previously mentioned calls for modifying or verifying access authorizations. To permit a node to access the function of another node, an access authorization to that effect (passing) is stored in OPA. Prior to implementation, each access is verified (inquire). Upon completion of the access, the access authorization in OPA is erased (returned). These calls are handled automatically, ensuring that node access operations are readily implemented.

11 Claims, 2 Drawing Sheets

SYSTEM FOR AUTOMATICALLY TRANSFERRING ACCESS AUTHORIZATION OF THIRD NODE TO FIRST NODE EVEN THROUGH FIRST NODE IS NOT PREVIOUSLY AUTHORIZED TO ACCESS FUNCTION OF SECOND NODE IN COMPUTER NETWORK

This application is a continuation, of the U.S. application Ser. No. 08/385,400, filed on Feb. 7, 1995, now abandoned, which is a continuation of the U.S. application Ser. No. 07/900,029 filed on Jun. 17, 1992, now abandoned.

FIELD OF THE INVENTION

The invention relates to a computer network with at least three nodes and apparatus for function implementation, wherein the first node is capable of accessing at least one function of the second node. The invention particularly addresses multi-media applications in such a network, and how multiple nodes are accessed.

BACKGROUND OF THE INVENTION

In FIG. 1, we show an example of a computer network which can be used for multi-media applications. With reference to that FIGURE as background, as an example, a computer network can have three or more nodes 11, 12, 13 which are interconnected by communication equipment. Each node comprises devices, among others computers, for implementing predetermined functions. Thus, node 12 controls a camera for the "point" and "show" functions, whereas node 13 controls a recorder for the "record" function. With the aid of suitable calls, known as "remote procedure calls", these functions are accessible by an application that is being run on a computer of node 11, i.e. the application is capable of causing the camera to carry out the "show" function, for example.

A prerequisite for this is that the application is authorized to access the camera. For this purpose, access lists 15, 16 may be used which are associated with the nodes 12, 13. By means of the access list 15, it is possible to store any other node authorized to access the functions of the node 12, i.e. the camera. If the access list 15 authorizes the application to access the camera, such access is granted, alternatively it is rejected. This analogously applies to the access list 16 for the recorder of the node 13.

It is frequently desirable or necessary for, say, the node 11, not to access node 12 directly but indirectly through node 13. This may be the case, for instance, when the application wants to access the "record" function of the recorder while that function in turn is requiring access to the "show" function of the camera. If in such a case only node 11 but not node 13 is registered as authorized in the access list 15, the recorder's access to the camera will be rejected. Therefore, it is necessary that prior to the application's indirect access to the camera, node 13 of the recorder is entered in access list 15. This may be done, for instance, by the application itself, although, in order to protect access list 15, further access lists may be required in this case. To ensure that the contents of access list 15 are consistent, the recorder must be erased from this list following such indirect access.

In particular for short indirect access operations, the storage space required for keeping different access lists in the nodes is substantial as is the number of instructions and calls individual nodes require for modifying the access lists in other nodes. In addition, such modifications are highly error-prone and difficult to understand by a user.

SUMMARY OF THE INVENTION

It is the object of the invention to provide a computer network and a method of operating a computer network which readily permits indirect access operations.

This object is accomplished by a computer network comprising apparatus for automatically storing an authorization of the first node to access the second node and for automatically storing the transfer of the access authorization from the first to the third node. In accordance with the invention indirect accessing is accomplished by providing automatically storing of access authorization of the first node to the second node and for automatically storing the transfer of the access authorization from the first node to the third node.

Access authorizations are stored automatically. The user has nothing to do with modifying and monitoring the access authorizations. As a result, the error frequency is greatly reduced. Apart from this, it is no longer necessary to assign different access authorization lists to each node, which saves storage space therein. The fact that the inventive apparatus grants access authorizations on a case-by-case basis, reduces the storage space required even further and leads to improved reliability.

For embodiments of the invention, calls are provided for transferring an access authorization, for terminating an access authorization, and/or for verifying an access authorization. By means of those calls, the access authorizations stored in the inventive apparatus are modified and/or verified. The access authorizations are dynamically up-dated, each node being capable of querying or verifying particular access authorizations.

The calls provided for, on which the access authorizations and their modifications depend, are automatically transmitted. They are based on interface descriptions of the individual nodes.

According to a further embodiment of the invention, the inventive apparatus for automatically storing access authorizations is accommodated in one of the three nodes or in a fourth node, with further means being provided for transmitting the calls between the various nodes. The inventive means for automatically storing access authorizations may be accommodated in any one of the nodes. For transmitting the calls between the different nodes, suitable means are provided. Via communication equipment, the calls are automatically transmitted from the individual nodes to the inventive apparatus for storing access authorizations. The user has nothing to do with any of these processes.

Yet a further embodiment of the invention provides for apparatus for the limited transfer of access authorizations. This allows the user to authorize specific nodes to access other nodes.

Finally, the invention covers a method of operating a computer network with at least three nodes, wherein means for function implementation are provided, comprising the following steps: Providing apparatus for automatically storing authorizations permitting the nodes to access each other, transmitting calls for modifying access authorizations, and transmitting calls for verifying such authorizations.

DESCRIPTION OF THE DRAWINGS

Further advantageous embodiments of the invention will be seen from examples of the invention which are described below with reference to drawings.

DETAILED DESCRIPTION

We have already described a network which can have three or more nodes in the background to show the environment in which the invention resides.

Figure 1:
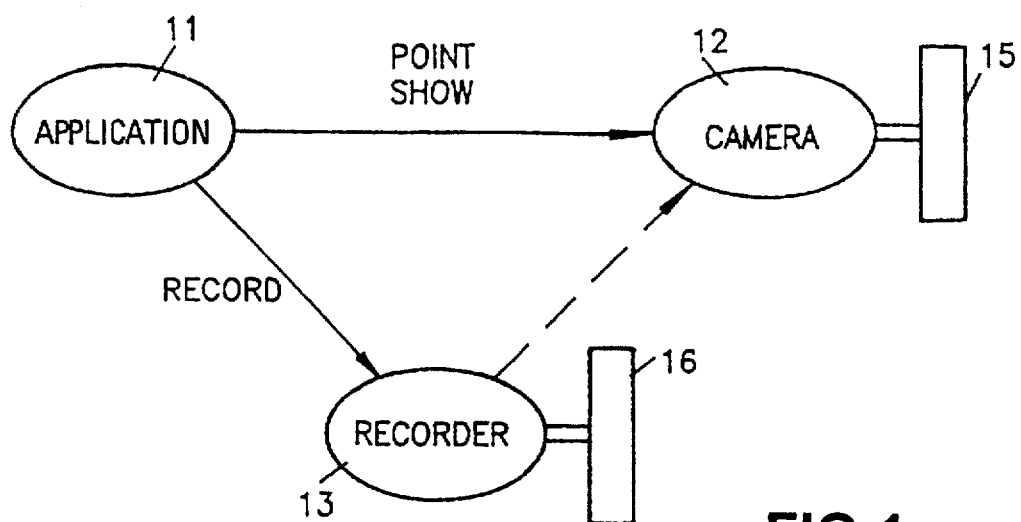
FIG. 1 shows a functional block diagram of example of such a computer network as used for multi-media applications.
Figure 2:
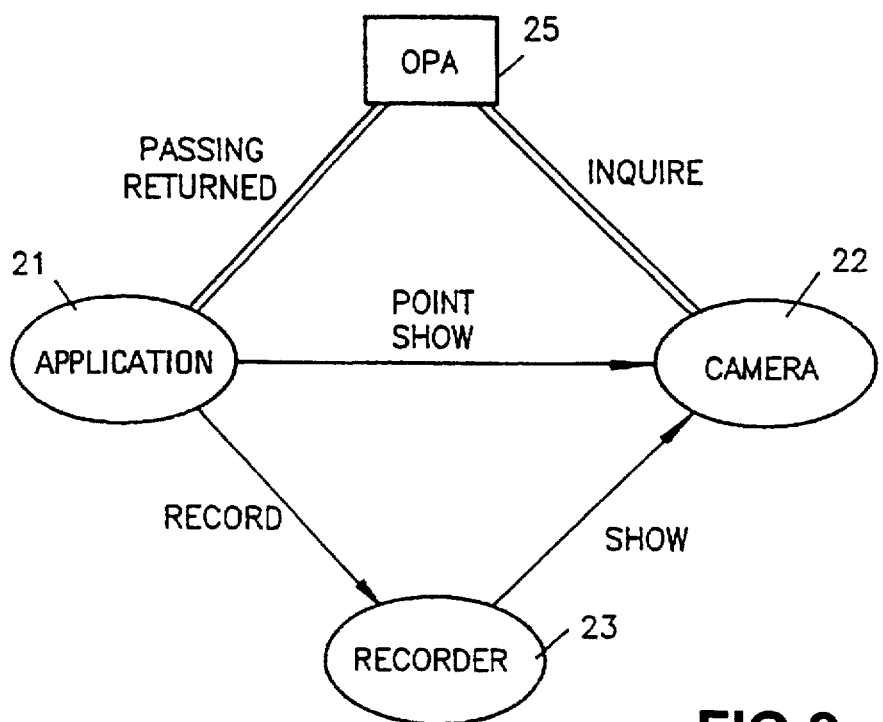
FIG. 2 shows a functional block diagram of the inventive computer network.

FIG. 2 shows a computer network with three nodes 21, 22, 23. Each node comprises devices, such as computers or other apparatus for implementing functions. Thus, node 21 is fitted with a computer for executing applications, such as programs, node 22 with a camera which is tilted by the "point" function and shows images in response to the "show" function, and node 23 with a recorder making recordings in response to the "record" function. Nodes 21, 22, 23 are interconnected by communication equipment for transmitting calls from one node to the other nodes.

Also provided is an OBJECT PASSING AGENT OPA 25 which may either be accommodated in one of the nodes 21, 22 or form part of a further node. In any case, calls or the like may also be transmitted between the OPA 25 and the existing nodes.

For the following description of an indirect access of the application to the camera by means of the recorder it is assumed that the application is authorized to access the the "point" and "show" functions of the camera. It is also assumed that the application is authorized to access the "record" function of the recorder, and that the recorder is not authorized to access the camera.

Figure 4:
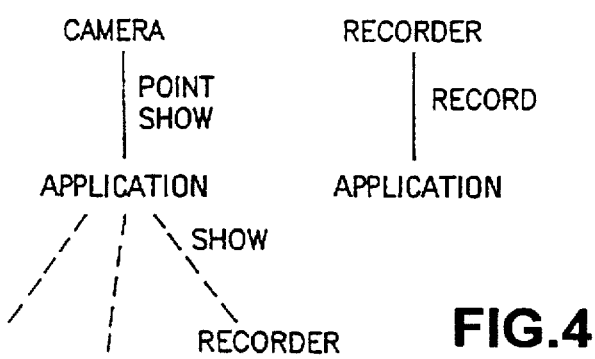
FIG. 4 shows a a flow diagram illustrating the process of the access authorizations for indirect access according to FIG. 3.

The access authorizations are stored in OPA 25, as shown by way of an access authorization tree in FIG. 4. Linking the camera and the application with the associated "point" and "show" functions indicates that the application is authorized to access the camera (FIG. 4, on the left). Similarly, linking the recorder, the application and the associated "record" function indicates that the application is authorized to access the recorder (FIG. 4, on the right). At that stage, there is no link between the recorder and the camera for the "show" function; this being marked by a broken line (FIG. 4, on the left).

For implementing the "record" function of the recorder, the recorder has to access the "show" function of the camera.

Figure 3:
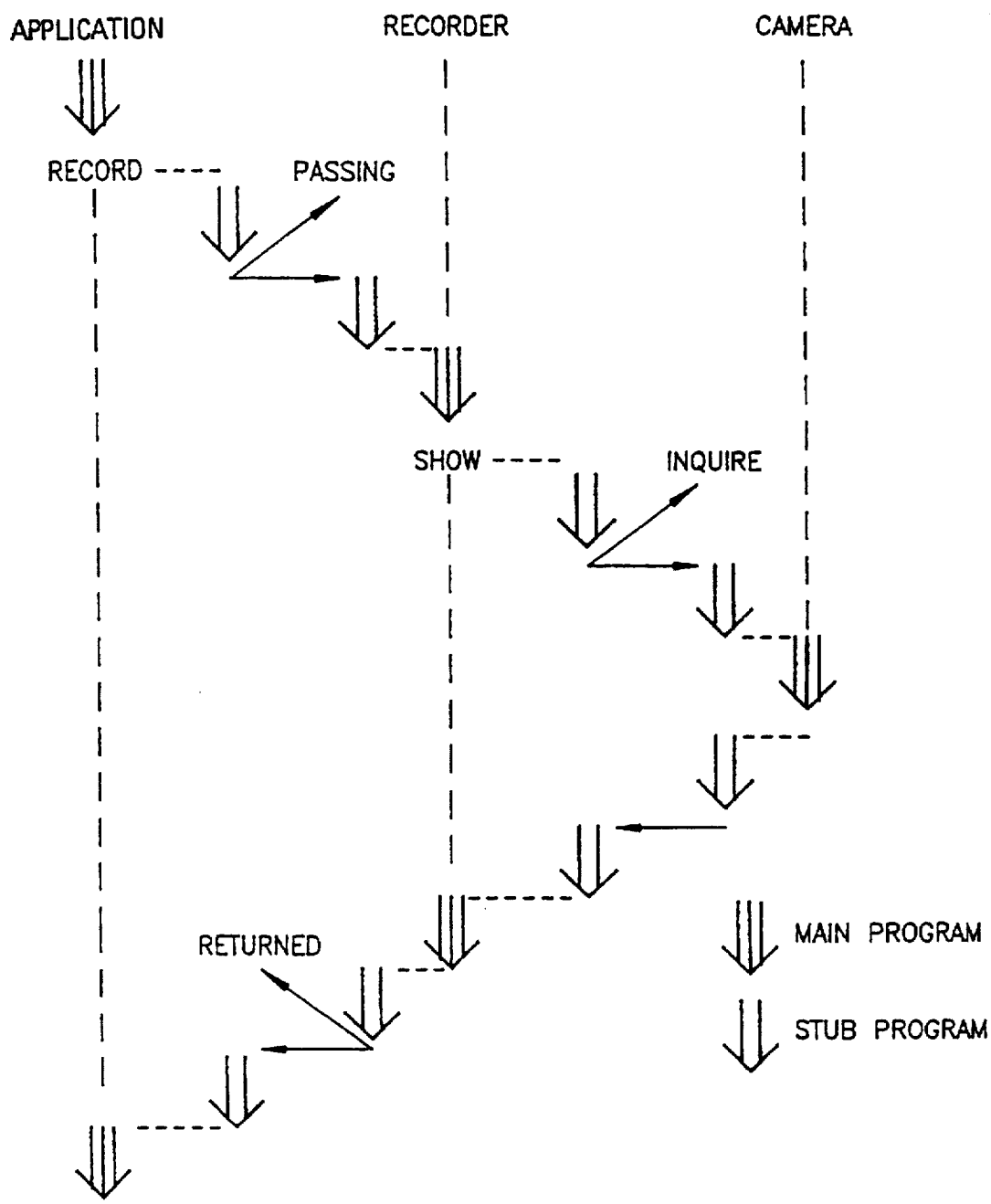
FIG. 3 shows a a flow diagram illustrating the process of an indirect access to a function of a node of the computer network of FIG. 2.

How such an indirect access proceeds is shown in the schematic of FIG. 3 which distinguishes between a MAIN program and a STUB program. If an instruction or a call for accessing a function of another node is encountered during a MAIN program, the MAIN program is stopped and an associated STUB program is invoked. The STUB program collects and "packs" the information necessary for calling the function, transmitting it to the node concerned. Within the node, this information is received by an associated STUB program, "unpacked" and passed to the MAIN program implementing the function. By means of the STUB programs, transmissions are carried out within the computer network irrespective of the data formats or the like stored in the nodes of the computer network.

As shown in FIG. 3, the call "record" occurs during the application's MAIN program. The meaning of this call is that the recorder is desired to implement the "record" function. For implementing that function, the recorder is simultaneously authorized by the application to access the "show" function of the camera. An associated STUB program transmits the information necessary for the "record" function to the STUB program of the recorder. At the same time, the STUB program of the application transmits a call "passing (show, recorder)" to OPA 25. This tells OPA 25 that the recorder is to be authorized by the application to access the "show" function of the camera. This is shown in FIG. 4 by the access authorization tree comprising a broken line link between the application, the recorder and the associated "show" function (FIG. 4, on the left). As a result, the application's authorization to access the "show" function of the camera is passed to the recorder.

At some point during the MAIN program of the recorder the call "show" is encountered which means that the "show" function of the camera is to be implemented. This in turn causes the MAIN program of the recorder to be stopped and the information necessary for the "show" function to be passed on to the MAIN program of the camera by means of the associated STUB program. At the same time an "inquire (show, recorder)" call is issued to OPA 25 to inquire whether the recorder is authorized to access the "show" function of the camera.

OPA 25 verifies this inquiry with the aid of the access authorization tree (FIG. 4) indicating that the application's authorization to access the "show" function of the camera has been passed on to the recorder. This means that the recorder is indirectly authorized to access the camera's "show" function, so that the "inquire" call to OPA 25 prompts a positive reply.

The camera performs the "show" function. Upon completion of that function, the necessary information is again passed to the MAIN program of the recorder by means of associated STUB programs. When the "record" function of the MAIN program of the recorder is completed, the relevant information is passed to the application's MAIN program with the aid of associated STUB programs. At the same time a call "returned (show, recorder)" is sent to OPA 25, in response to which the link between the camera and the recorder for the "show" function is erased, so that the authorization to access the camera's "show" function which the application assigned to the recorder no longer exists.

The program of the application then continues with the previously mentioned access authorizations for the "point" and "show" functions of the camera and the "record" function of the recorder. Further access authorization no longer exist.

In summary this means that an OPA 25 (FIG. 2) is provided which receives calls ("passing", "inquire", "returned") (FIG. 3) which either lead to a modification of the access authorization tree ("passing", "returned") or to this tree being queried in response to "inquire" calls (FIG. 4).

The entire process proceeds automatically. OPA 25 forms part of the computer network which is user-independent. The calls "passing", "inquire" and "returned" are generated and transmitted by the STUB programs which in turn are generated by a compiler and which are equally user independent.

The only task of the user is to establish by way of interface descriptions in the individual nodes that access authorizations may be passed on. For the example referred to, the interface descriptions might look as follows:

Interface camera: function show ( . . . ) function point ( . . . );

Interface recorder: function record (camera/object).

These interface descriptions signify that the camera is capable of performing the "show" and "point" functions and the recorder the "record" function. The OBJECT reference parameter "camera/object" indicates that the user has granted permission for the access authorization to the camera to be passed on to the recorder. In other words, by means of the OBJECT reference parameter the user allows the recorder to access the camera.

As previously mentioned, these user-prepared interface descriptions are processed by a compiler which generates among others the STUB programs therefrom. With the aid of the OBJECT reference parameter in the interface descriptions, the compiler generates the calls "passing", "inquire" and "returned" in the STUB programs described in conjunction with FIG. 3. The call "record" in the MAIN program of the application prompts the call "passing" in the associated STUB program. The call "show" in the MAIN program of the recorder prompts the call "inquire" in the associated STUB program. Upon completion of the MAIN program of the recorder, the compiler activates the call "returned" in the relevant STUB program, which terminates the transfer of the recorder's authorization to access the camera.

The described example proceeds from the assumption that for implementing the "record" function the recorder has to access the "show" function of the camera. An access of the recorder to the "point" function of the camera is not required. This is reflected by the fact that the calls "passing", "inquire" and "returned" only involve the "show" function of the camera. In other words, the transfer of the authorization to access the camera is limited to its "show" function, excluding the "point" function. The authorization to access the camera may also be passed on an unlimited scale.

For the described example, the authorization to access the camera was assigned to the recorder and withdrawn after a predetermined time. The authorization to access the camera may also be assigned to other nodes for implementing several calls in parallel. This is indicated by further broken lines in the access authorization tree of FIG. 4. The transfer of access authorizations and their termination is carried out in response to "passing" and "returned" calls, with these calls addressing different nodes.

Similarly, the described transfer of an access authorization may be effected in several stages, with the recorder transferring the authorization to another node. Such cascaded transfer proceeds in the same way as the above described transfer.

What is claimed is:

1. Computer network comprising:

at least a first, a second, and third computer nodes interconnected for communication computer means for performing at least one function in the second node, means for the third node to access the function of the second node computer means for performing at lest one function in the third node which requires accessing the second node, means for the first node to access the function of the second node, and agent means for automatically storing an access authorization of the first node to access the second node and for automatically storing a transfer from the first node to the third node of access authorization to provide access for the second node to access the function of the third node to respond to the access of the first node to the function of the second node.

2. The computer network of claim 1, further comprising:

means for a call signal to transfer the access authorization.

3. The computer network of claim 1, further comprising:

means for a return call signal to terminate the transferred access authorization.

4. The computer network of claim 1, further comprising:

means for verifying access authorization in response to a call signal.

5. The computer network of claim 1, in which, the agent means are accommodated in a fourth node, and further comprising means for transmitting call signals between different nodes.

6. The computer network of claim 1, further comprising:

means for a call signal to transfer access authorization on a limited scale.

7. The computer network of claim 1, further comprising:

means for simultaneously transferring the access authorization to several nodes.

8. The computer network of claim 1, further comprising:

means for transferring the access authorization in several steps.

9. A method of operating a computer network with at least a first, a second, and a third computer nodes and means for performing functions comprising the steps:

automatically storing authorization for the first node to access functions on the second node, accessing a function from the first node, on the third node that requires the third node to automatically access a function on the second node, automatically modifying the access authorization of the third node, for the third node to access the function of the second node, in response to the access of the first node to the function of the third node and depending on the access authorization of the first node, automatically accessing, from the third node, the function of the second node, and automatically verifying the access authorization of the third node to access the second node.

10. The method of claim 9, in which functions of one node are accessed by another node by call signals which are automatically transmitted over the network.

11. The method as claimed in claim 9, in which, the access is modified and access is verified by call signals transmitted between different nodes.

* * * * *

UNITED STATES PATENT AND TRADEMARK OFFICE
CERTIFICATE OF CORRECTION

PATENT NO. : 5,778,176
DATED : 07/07/98
INVENTOR(S) : K. Geihs et al

It is certified that error appears in the above-indentified patent and that said Letters Patent is hereby corrected as shown below:  On the title page: Item [54] and Column 1, line 4, please delete "through" and insert --though--.

Signed and Sealed this

Fifth Day of January, 1999

*Attest:*

*Attesting Officer*      *Acting Commissioner of Patents and Trademarks*